Jan. 12, 1960

J. G. HOFFMAN 2,921,203

AUTOMATIC BIAS SHIFT CIRCUIT

Filed April 19, 1944

INVENTOR
JOSEPH G. HOFFMAN
BY W. Glenn Jones
ATTORNEY

United States Patent Office 2,921,203
Patented Jan. 12, 1960

2,921,203

AUTOMATIC BIAS SHIFT CIRCUIT

Joseph G. Hoffman, Buffalo, N.Y., assignor to the United States of America as represented by the Secretary of the Navy Application April 19, 1944, Serial No. 531,785

2 Claims. (Cl. 250—214)

(Granted under Title 35, U.S. Code (1952), sec. 266)

This invention relates to photoelectric cell circuits and particularly to an amplifier circuit for use in a photoelectric proximity fuze such as that described in copending application, Serial No. 570,689, filed December 30, 1944, by Joseph E. Henderson et al.

In fuzes of this type it is important that the same percentage change of light intensity, or light signal, produce substantially the same response in the amplifier for all practical light levels. In order to accomplish this, nonlinear photocell load resistances such as "Varistor" or "Thyrite" types have been used. These have the property that their A.C. impedance decreases with increase of current through them. Therefore as the light level increases, for instance, so that the photocell passes a larger current, the load resistance is simultaneously reduced so that the IR drops across the load, which is applied to the amplifier grid, remains approximately the same for various light levels and the same percentage change of light will produce approximately the same response in the amplifier.

The present invention has as its principal object the provision of means whereby the need for special resistances of the nonlinear type, in order to achieve uniform response, is eliminated, and like results may be attained using standard, inexpensive and readily available linear resistors.

Other objects will be apparent from the following description. taken in conjunction with the drawings forming a part hereof, in which.

Figures 1, 2, 3:
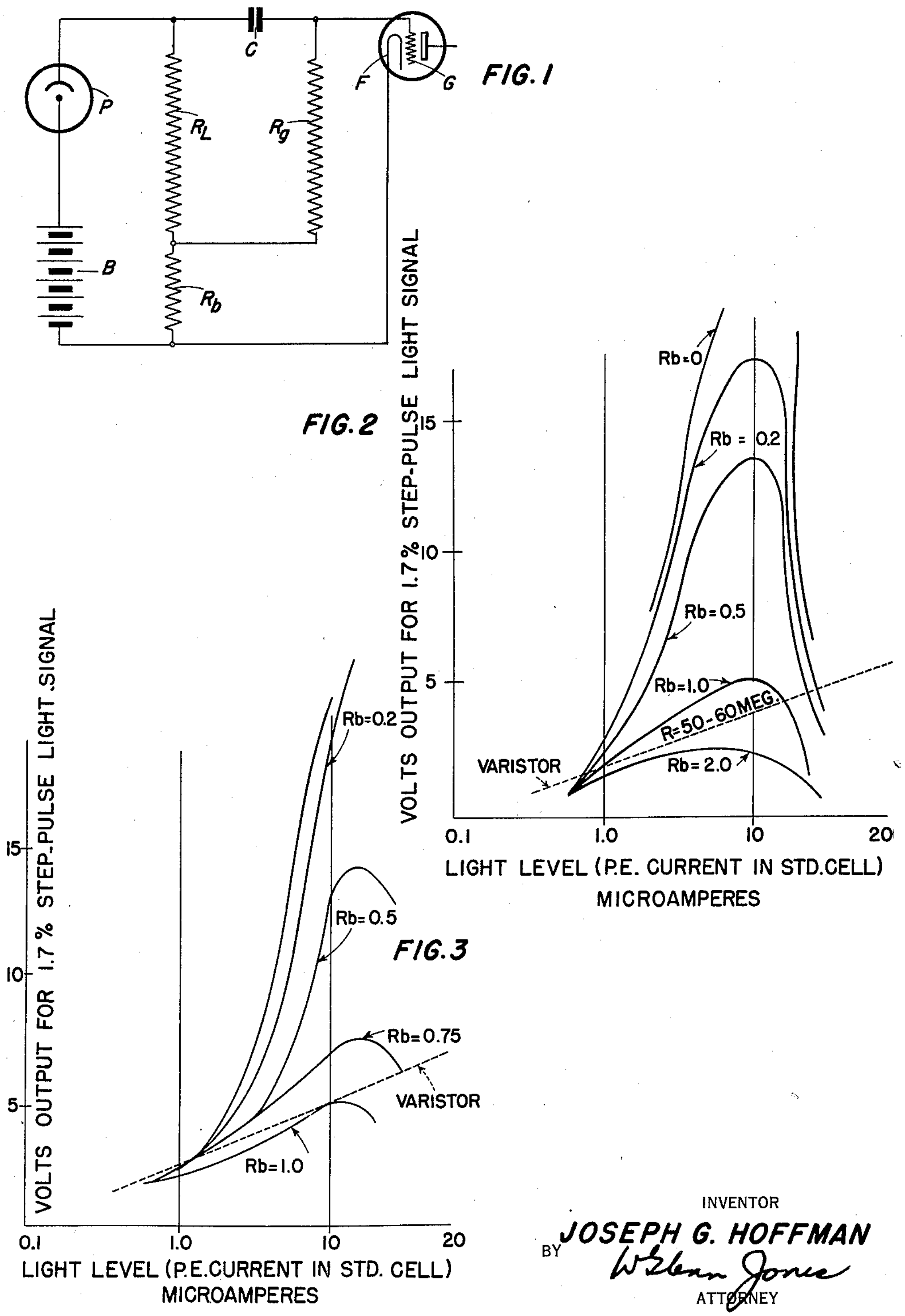
Figure 1 is a circuit diagram showing a photocell circuit and an associated amplifier briefly indicated.
Figure 2 shows a set of curves illustrative of the operation of my circuit.
Figure 3 shows curves similar to those of Figure 2 but with a different load resistance.

Referring now to the drawings, photocell P, Figure 1, is connected in series with battery B (or other constant potential source) and a resistance network comprising the series connected load resistance $R_L$ and biasing resistor $R_b$. Condenser C is connected between one terminal of resistance $R_L$ and Grid G of the amplifier tube, thereby coupling the amplifier to the series photocell circuit whereby to amplify only the varying component of said photocell current in said series circuit. The filament F is connected to the battery-connected terminal of resistor $R_b$, and a high resistance $R_g$ is connected between grid G and the junction point of resistances $R_L$ and $R_b$, applying as a biasing potential to said grid a voltage drop dependent upon the comparative value of the resistors $R_L$ and $R_b$ and upon the light intensity to which the cell is exposed.

It will be seen that as the light level increases, with the result that a larger current is passed through resistances $R_b$ and $R_L$, the potential drop across $R_b$ will be increased so that grid G will be biased more positively as the light level increases. Accordingly, equal fluctuations in light intensity will produce equal response in said amplifier notwithstanding the relative level of light intensity at which said equal fluctuations occur.

The curves of Figure 2 show amplifier output in volts plotted against light level as measured by the photocell current with different relative values of resistors in the photocell circuit, for a 1.7% signal or light change. These curves show a comparison between the results obtained with a 50–60 megohm nonlinear resistance input circuit or "Varistor" ($R_b=d$), and the results obtained with the circuit of the present invention employing various values of $R_b$, wherein $R_L=10$ megohms and $R_g=90$ megohms. The 10 megohm resistor produces a sharp dropping off of output at high light levels ($>10\mu a$). This effect is reduced by making $R_L=5$ megohms, as illustrated by the curves of Figure 3. In this figure it will be seen that when $R_b=1.0$ or 0.75 megohm the response is substantially equivalent to that produced by the nonlinear "Varistor." The greatest difference between the linear resistance network and the "Varistor" circuit occurs at low light levels (in the neighborhood of $1.0\mu a$).

It will be apparent that by the proper choice of the biasing resistor $R_b$, the rate of increase of sensitivity can be adjusted to any desired value.

The preferred embodiment of my invention herein disclosed is susceptible to variation within the spirit and scope of the appended claims.

The invention herein described may be manufactured and used by or for the Government of the United States of America for governmental purposes without the payment of any royalties thereon or therefor.

I claim:

1. A photoelectric relay comprising a source of direct current potential, a photocell and a resistance network connected in series therewith, an amplifier having a control electrode, means coupling said amplifier to said series circuit whereby to amplify only the varying component of said photocell current in said series circuit produced by fluctuations in light intensity to which said photocell is exposed, a high resistance connecting said control electrode to said resistance network to provide a potential bias increasing with increasing photocell current whereby equal fluctuations in light intensity produce substantially equal response in said amplifier notwithstanding the relative level of light intensity at which said equal fluctuations occur.

2. A photoelectric relay comprising a photocell having an anode and a cathode, a source of direct current potential having a positive terminal connected to said anode, a first and second fixed resistor connected as a load in series across said cathode and the negative terminal of said direct current potential, an electronic discharge device having an anode, a cathode, and a control electrode, means electrically connecting said cathode to the negative terminal of said direct current potential, a capacitor coupling said control electrode to the common junction of said load and photocell cathode, and a third resistor connecting the junction of said first and second resistors to said control electrode for applying as a biasing potential to said control electrode a voltage drop dependent upon the light intensity of said photocell and the values of said fixed resistors.

References Cited in the file of this patent

UNITED STATES PATENTS

| | | |
|---|---|---|
| 1,889,758 | Nakken | Dec. 6, 1932 |
| 1,895,531 | Weaver | Jan. 31, 1933 |